United States Patent
Ela et al.

(10) Patent No.: US 6,957,626 B2
(45) Date of Patent: Oct. 25, 2005

(54) BIRD FEEDER WITH RELEASABLY REMOVABLE BASE

(76) Inventors: John D. Ela, 120 Fisherville Rd., Apt. 52, Concord, NH (US) 03303; Michael Martin Dunn, 36 Foxcress Cir., Concord, NH (US) 03301

( * ) Notice: Subject to any disclaimer, the term of this patent is extended or adjusted under 35 U.S.C. 154(b) by 86 days.

(21) Appl. No.: 10/195,624

(22) Filed: Jul. 12, 2002

(65) Prior Publication Data

US 2004/0031443 A1 Feb. 19, 2004

(51) Int. Cl.[7] ............................................. A01K 61/02
(52) U.S. Cl. ...................................................... 119/57.9
(58) Field of Search ........................ 119/522–524, 57.8, 119/57.9

(56) References Cited

U.S. PATENT DOCUMENTS

| | | | | |
|---|---|---|---|---|
| 86,381 A | | 2/1869 | Little | |
| 996,214 A | * | 6/1911 | Cockrum | 119/52.1 |
| 1,840,615 A | * | 1/1932 | Adruser et al. | 119/77 |
| 2,133,550 A | | 10/1938 | Little | 140/71 |
| 2,725,663 A | * | 12/1955 | Mullen | 43/131 |
| 4,434,745 A | | 3/1984 | Perkins et al. | 119/51 R |
| 4,738,221 A | * | 4/1988 | Nock | 119/52.2 |
| 4,829,934 A | * | 5/1989 | Blasbalg | 119/57.8 |
| 4,977,859 A | * | 12/1990 | Kilham | 119/52.2 |
| 5,016,573 A | | 5/1991 | Power | 119/57.9 |
| 5,062,388 A | * | 11/1991 | Kilham | 119/52.2 |
| 5,111,772 A | | 5/1992 | Lipton | 119/579 |
| 5,207,181 A | | 5/1993 | Loken | 119/57.9 |
| 5,215,039 A | * | 6/1993 | Bescherer | 119/57.8 |
| 5,235,935 A | * | 8/1993 | Edwards | 119/57.8 |
| 5,406,908 A | * | 4/1995 | Burleigh | 119/57.8 |
| 5,671,696 A | * | 9/1997 | Liethen | 119/57.8 |
| 5,699,753 A | * | 12/1997 | Aldridge, III | 119/52.1 |
| 5,701,842 A | * | 12/1997 | Whittles | 119/52.2 |
| 5,775,257 A | * | 7/1998 | Park | 119/57.8 |
| 5,791,286 A | | 8/1998 | Taussig et al. | 119/52.3 |
| 5,826,540 A | * | 10/1998 | Bridges | 119/52.3 |
| 5,829,382 A | | 11/1998 | Garrison | 119/52.2 |
| 6,116,189 A | | 9/2000 | Rundle | 119/51.5 |
| 6,192,832 B1 | | 2/2001 | Husnik | 119/57.9 |
| D452,049 S | | 12/2001 | Stokes et al. | D30/124 |
| 6,640,745 B1 | * | 11/2003 | Park | 119/52.2 |

* cited by examiner

*Primary Examiner*—Thomas Price
(74) *Attorney, Agent, or Firm*—Davis & Bujold PLLC

(57) ABSTRACT

A bird feeder having an elongate bird feed container open at opposed ends thereof. The bird feed container defines a longitudinal axis A and has a plurality of feeding ports provided in a sidewall of the bird feed container to facilitate eating by a bird. A removable cover covers the top end of the bird feed container, and the cover has both an open position, in which the cover is spaced from the top end to facilitate supplying bird feed into the bird feed container, and a closed position, in which the cover engages with and covers the top end of the bird feed container. A handle member connected to the bird feed container for hanging the bird feeder. A removable base engages with the bottom end of the bird feed container. The removable base has a closed position, for sealing the open bottom end of the bird feed container, and an open position in which the base is removed from the bird feed container to facilitate cleaning of the bird feed container and the base. Relative movement between the base and the bird feed container, both along the longitudinal axis of the bird feeder as well as rotation about the longitudinal axis is required for removing the base from the bird feed container. A cage surrounds and encases the bird feed container.

18 Claims, 13 Drawing Sheets

BIRD FEEDER WITH RELEASABLY REMOVABLE BASE

FIELD OF THE INVENTION

The present invention relates to a releasably removable base for a bird feeder to facilitate cleaning of the bird feeder. The present invention also relates to a bird feeder having a bird feed container which may be releasably accommodated within a cage that only allows certain birds to enter therein and access the bird feed while preventing other larger birds or animals from entering therein and/or accessing the bird feed within the bird feed container.

BACKGROUND OF THE INVENTION

Numerous bird feeders are currently available in the marketplace. These currently available bird feeders have many different shapes, configurations and designs for ensuring bird feed is readily available at specific access ports for the birds and a variety of these bird feeders are specifically directed at preventing animals other than birds, e.g., squirrel, chipmunks, etc., from feeding from the bird feeders.

Regardless of the design of the bird feeder that is utilized, a common problem associated with all bird feeders is that only a single access opening is provided at the top of the feeder for introducing bird feed into the bird feeder, as well as for cleaning the bird feeder. It is a well known problem that a portion of the bird feed introduced into the feeder tends to settle to the bottom of the bird feeder and is not consumed by the birds. In the event that this unconsumed bird feed remains in the bird feeder for a prolonged period of time, e.g., a number of days or a few weeks or so, such unconsumed bird feed has a tendency, especially under moist conditions, to rot and/or commence decomposition. Rotting or decomposing bird feed has a tendency to give off an unpleasant odor, causes the bird feeder to look unsightly and may introduce health concerns for birds contacting the bird feeder.

While introduction of bird feed into the top of bird feed container may be usually accomplished by merely pouring bird feed from an external source into the access opening, cleaning any rotting or decomposing bird feed located down inside of the bird feed, container through the sole access opening, can be a particularly daunting task. As it is often necessary to clean the conventional bird feeder, from time to time, through the access opening in the top of the feeder, this creates a first problem as the bird feeder is usually hung by a handle which is often out of reach and generally inaccessible, and secondly, once the bird feeder is accessed, it is necessary to reach far inside the bird feeder with a hand or a suitable tool to attempt to clean out the rotting or decomposing bird feed located at the bottom of the feeder. In many cases, the entire bird feeder must be removed or taken down from its mounting or hanging position to facilitate cleaning. It may still be difficult to clean as the user must somehow reach the rotting or decomposing bird feed generally located at the bottom of the bird feeder.

Another well known problem with bird feeders is that unwanted animals, such as squirrels, racoons, bears or any of the numerous menagerie of woodland mammals, and even certain unwanted birds, are attracted to the bird feeder. Numerous devices for preventing these undesirable animals from feeding at bird feeders are known in the art. For example, an inverted cone, commonly known as a squirrel baffle, is often installed below a bird feeder mounted on a pole to provide a physical barrier and prevent squirrels from climbing the pole to access the feeder. Many hanging feeders have domes mounted over the feed container which provides limited traction for squirrels or other animal. Often, the edge of the dome partially defines a gap of limited size through which access to the bird feeder is restricted.

Additionally, cages or open works with sized openings that allow certain size birds access to the feed container inside the cage, while keeping unwanted birds and/or pests out, are known. These cages are usually cylindrical in shape and serve a utilitarian purpose.

One difficulty often associated with bird feeders having a cage configured in the above described manner is that when the bird feed needs replenishing, the entire cage and bird feeder combination must be taken from its hung feed/display position to be refilled. This can be an unpleasant task as the cage can be quite heavy, and one may often have to reach quite high, or balance the entire unit for removing or remounting the bird feeder and cage from a hung feed/display position.

SUMMARY OF THE INVENTION

Wherefore, it is an object of the present invention to overcome the above mentioned shortcomings and drawbacks associated with the prior art.

Another object of the present invention is to provide a releasably removable base, for a bird feeder, to facilitate cleaning of both the base and a lower portion of the bird feeder and minimize the possibility that any bird feed, remaining in the bird feeder for prolonged periods of time, will rot and/or commence decomposition.

A further object of the present invention is to provide a releasably removable base which is easy to remove from a remainder of the bird feeder unit by an end user but the releasably removable base remains quite difficult or impossible for an animal to remove.

Yet another object of the present invention is to provide a base which can be adapted for attachment to currently available bird feeders with only a minor alteration to the base and/or the lower portion of the bird feeder.

A still further object of the present invention is to provide a base which is releasably removable from a bird feeder incorporating a cage that completely encases in the bird feed container to prevent unwanted birds and other animals, e.g., squirrel, chipmunks, etc., from feeding from the bird feed container.

Another object of the present invention is to provide a combined base that releasably supports a bird feed container and the combined base/bird feed container are both releasably removable from a cage that completely encases in the bird feed container to prevent unwanted birds and other animals, e.g., squirrel, chipmunks, etc., from feeding from the bird feeder. Once the combined base is removed, the base is separatable from the bird feed container to facilitate cleaning of those components.

The present invention also relates to a bird feeder, for holding a quantity of bird feed, comprising: an elongate bird feed container being open at opposed top and bottom ends thereof, and the bird feed container defining a longitudinal axis A; a handle member connected to the bird feed container for hanging the bird feeder; a plurality of feeding ports provided in a sidewall of the bird feed container to facilitate eating of bird feed from the bird feed container by a bird; a removable cover for covering the open top end of the bird feed container, the cover having both an open position, in which the cover is spaced from the top end to facilitate supplying bird feed into the bird feed container, and a closed position, in which the cover engages with and covers the top end of the bird feed container; and a removable base for engaging with the bottom end of the bird feed container, the removable base having a closed position, for sealing the open bottom end of the bird feed container and retaining bird feed within the bird feed container, and an open position in which the base is removed from the bird feed container to facilitate cleaning of the bird feed container and the base, and relative movement between the base and the bird feed container, both along the longitudinal axis of the bird feeder as well as rotation about the longitudinal axis, is required for removing the base from the bird feed container.

The present invention also relates to a bird feeder, for holding a quantity of bird feed, comprising: an elongate bird feed container being open at opposed top and bottom ends thereof, and the bird feed container defining a longitudinal axis A; a plurality of spaced apart horizontal members coupled to a plurality spaced part longitudinal members to form a cage, with the plurality of spaced apart horizontal and longitudinal members being sufficiently spaced apart from one another such that desired birds can enter the cage while larger birds and animals are unable to pass through the cage; a handle member connected to the cage for hanging the bird feeder; a plurality of feeding ports provided in a sidewall of the bird feed container to facilitate eating of bird feed from the bird feed container by a bird; a removable cover for covering the open top end of the bird feed container, the cover having both an open position, in which the cover is spaced from the top end to facilitate supplying bird feed into the bird feed container, and a closed position, in which the cover engages with and covers the top end of the bird feed container; and a removable base for engaging with the bottom end of the bird feed container, the removable base having a closed position, for sealing the open bottom end of the bird feed container and retaining bird feed within the bird feed container, and an open position in which the base is removed from the bird feed container to facilitate cleaning of the bird feed container and the base, and relative movement between the base and the bird feed container, both along the longitudinal axis of the bird feeder as well as rotation about the longitudinal axis, is required for removing the base from the bird feed container.

BRIEF DESCRIPTION OF THE DRAWING(S)

The invention will now be described, by way of example, with reference to the accompanying drawings in which:

FIG. 2D is a partial diagrammatic cross sectional view showing a second variation of the first embodiment of the base and the bird feed container of FIG. 2;

DETAILED DESCRIPTION OF THE INVENTION

Figure 1:
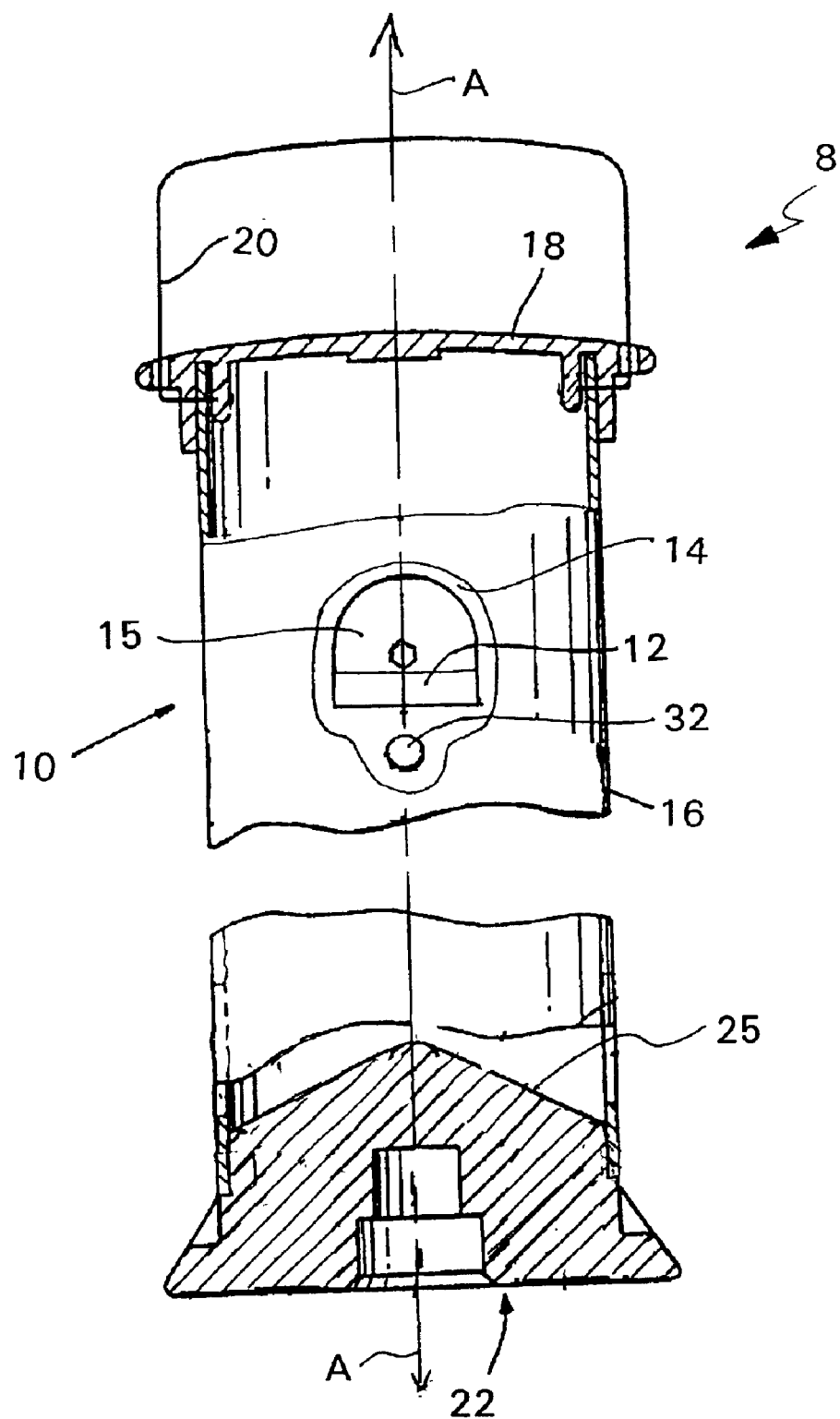
FIG. 1 is a diagrammatic front elevational view, shown partly in cross section, of a prior art bird feeder.

Turning now to FIG. 1, a brief overview of the various components of a conventional bird feeder will now be briefly discussed. As can be seen in this embodiment, the bird feeder 8 generally comprises a cylindrical elongate bird feeder tube or container 10 which is open at both opposed ends thereof, i.e. the top end and the bottom end, and provided with a plurality of pairs of spaced apart apertures 12 formed in a sidewall 16 of the bird feed container 10. The cylindrical elongate bird feed container 10 defines a longitudinal axis A of the bird feeder 8 and is typically manufactured from a tough transparent material such as cellulose acetate or polycarbonate, for example. Alternatively, the bird feed container 10 may also be of mesh material, e.g., wire or plastic mesh. The plurality of pairs of spaced apart apertures 12 are generally located diametrically opposed to one another and each one of the plurality of pairs of spaced apart apertures 12 is sufficiently sized to receive a corresponding feeding port 14 therein. The cylindrical shape of the container 10 is not essential and other shapes such as, for example, a container having a square cross section, a rectangular cross section, an octagonal cross section, etc., may be utilized as well.

Each feeding port 14 has a conventional construction and is received by one of the apertures 12 formed in the sidewall 16 of the bird feed container 10. Each feeding port 14 generally has a perch 32, either integrally formed therewith or connected thereto as a separate component, which is positioned below feeding port and extends normal to the longitudinal axis A of the bird feeder 8 to allow a bird to stand on the perch 32 while the bird is feeding through the inlet defined by the feeding port 14. Each feeding port 14 has a downwardly facing hood 15 which is of arcuate construction and each feeding port 14 is substantially concentric with the respective aperture 12. The feeding port 14 permits a bird, when standing on the perch 32, to retrieve bird feed from the bird feed container 10 by feeding through the inlet of the feeding port 14. The hood 15 prevents the bird feed from falling out through the inlet of the feeding ports 14 and/or onto a head of a bird while feeding therefrom. If desired, an inner end of the perch 32 can be anchored directly to the sidewall 16 of the bird feed container 10. In the preferred embodiment, a perimeter housing, the hood 15 and the perch 32 of the feeding port 14 are all manufactured integrally as an combined insert, however, other configurations are possible. The perimeter of the housing can include a decorative outer portion disposed adjacent the outer surface of bird feed container 10 to add to the aesthetic appeal of the bird feeder 8.

Each feeding port 14 has an end surface forming a portion of the hood 15 and extending radially into the bird feed container 10 and the end surfaces of the two adjacent feeding ports 14 abut against one another and are fastened to one another by a screw and nut assembly, or some other conventional but releasable fastening mechanism, extending though the end surfaces to securely attach the pair of adjacent feeding ports 14 to one another and within the pair of diametrically opposed apertures 12 of the bird feed container 10. It is also possible for the feeding ports 14 to have a "snap in" interference fit with the respective aperture 12 to securely retain the feeding ports 14 within the aperture 12 without any fasteners such that the end surfaces, forming a portion of the hoods 15, are spaced apart from and do not abut with one another to allow the bird feed to fall freely, through the space formed between the adjacent feeding ports 14, toward the bottom of the bird feed container 10. The feeding ports 14 are typically manufactured from a tough durable material such as steel, zinc, cast zinc, stainless steel, aluminum, durable plastic, or other conventional but well known materials. It is to be appreciated that generally one, two, three or four pairs of adjacent feeding ports are supported by the bird feeder 8. As the feeding ports are fairly conventional and well known in the art, a further discussion concerning the same is not provided.

A hanger member 20 is generally attached to a top portion of the bird feeder 8 to suspend or hang the bird feeder 8 from a desired a hook, a tree limb, a rope, or some other member, as is conventional and well known in the art. The hanger member 20 has a pair of legs and is preferably manufactured from a suitable wire that is pivotably secured to the sidewall of the top portion of the bird feed container 10. A releasable cover 18 is supported by the hanger member 20 and the cover 18 is sized to enclose and snugly receive the outer surface of the top end of the bird feeder 8. The cover 18 is provided with a pair of apertures therein which each receive a respective leg of the hanger member 20 to allow sliding motion of the cover 18 along the hanger member 20. Preferably a substantially segment of each leg of the hanger member 20 extends parallel to one another as well as to the longitudinal axis A of the bird feeder 8, when the hanger member 20 is in a vertical orientation hanging the bird feeder from a suitable member, to facilitate sliding motion of the cover 18 therealong.

The removable cover 18 has both an open position, in which the cover 18 is spaced from the top end of the bird feed container 10, and a closed position, in which the cover 18 snugly receives or engages with the top end of the bird feed container 10. When the cover 18 is slid along the legs of the hanger member 20 to its open position spaced from the top end of the bird feed container 10, this provides entry to the access opening for supplying, pouring or loading bird feed into the bird feed container 10. Once a sufficient amount of bird feed has been poured into or supplied to the top open end of the bird feed container 10, the cover 18 is then slid along the legs of the hanger member 20 to its closed position where the cover 18 snugly receives and encases the top end of the bird feed container 10. Such engagement between the cover 18 and the top end of the bird feed container 10 generally provides a sufficient watertight closure for the bird feeder 8 to minimize the amount of moisture which may enter the bird feeder 8 during use. As the above described components are conventional and fairly well known in the art, a further detailed description concerning the same is not provided.

One of the problems associated with prior art bird feeders is that the base of the bird feeder is generally fixedly or permanently attached to the sidewall 16 at the bottom end of the bird feed container 10. Such fixed or permanent attachment is conventionally done by an adhesive, a plurality of threaded fasteners or the like. By having the base 22 of the bird feeder fixedly or permanently attached to the bottom end of the bird feeder, cleaning of the base 22 as well as cleaning of the bottom portion of the bird feeder, to remove any partially rotted or decomposed bird feed, is quite difficult.

Figure 2:
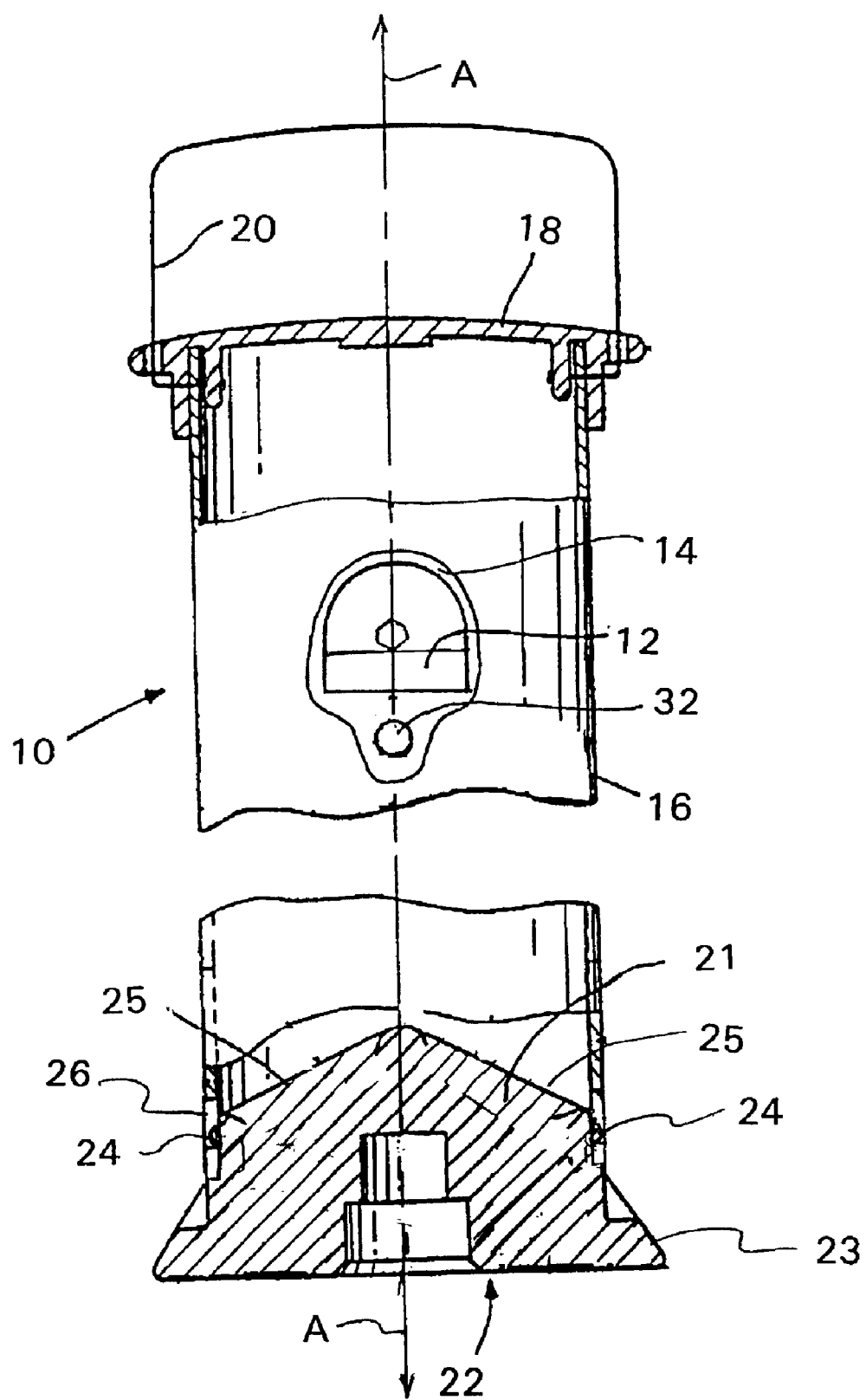
FIG. 2 is a diagrammatic front elevational view, shown partly in cross section, of a first embodiment of the improved bird feeder according to the present invention.

To overcome this problem, as can be seen with reference to FIG. 2, the present invention provides a readily removable base 22. The removable base 22 comprises a smaller dimensioned cylindrical portion 21 which is sized to be received by and within the bottom end of the bird feed container 10 and also includes a larger head portion 23 which has a larger dimension than that of the bottom end of the bird feed container 10 to form a stop thereby limiting the amount of insertion of the base 22 within the bottom end of the bird feed container 10. The smaller dimensioned cylindrical portion 21 has a pair of diverter surfaces 25 which channel or divert the bird feed radially outward toward the lower most feeding ports 14. The base 22 has both an open position, shown in FIG. 2A, in which the base 22 is removed and spaced from the bottom end of the bird feed container 10, and a closed position, in which the smaller dimensioned cylindrical portion 21 of the base 22 is snugly received by the bottom end of the bird feed container 10, shown in FIG. 2. The base 22 may be provided with one or more drainage holes (not shown in this embodiment) which extend through the bottom surface of the base 22 to facilitate drainage of any moisture which is located within the bird feeder.

When the base 22 is removed from the bottom end of the bird feeder, as described below in further detail, such removal provides complete access to both the base 22 as well as the bottom end of the bird feed container 10 to facilitate cleaning thereof, e.g., with a brush or some other tool. Once both the base 22 and the bird feed container 10, including the bottom end thereof, are adequately cleaned, the base 22 is then reattached to or reengaged with the bottom end of the bird feed container 10 so that the base 22 will again be located to support additional bird feed once loaded into the bird feed container 10 following cleaning.

Figure 2A:
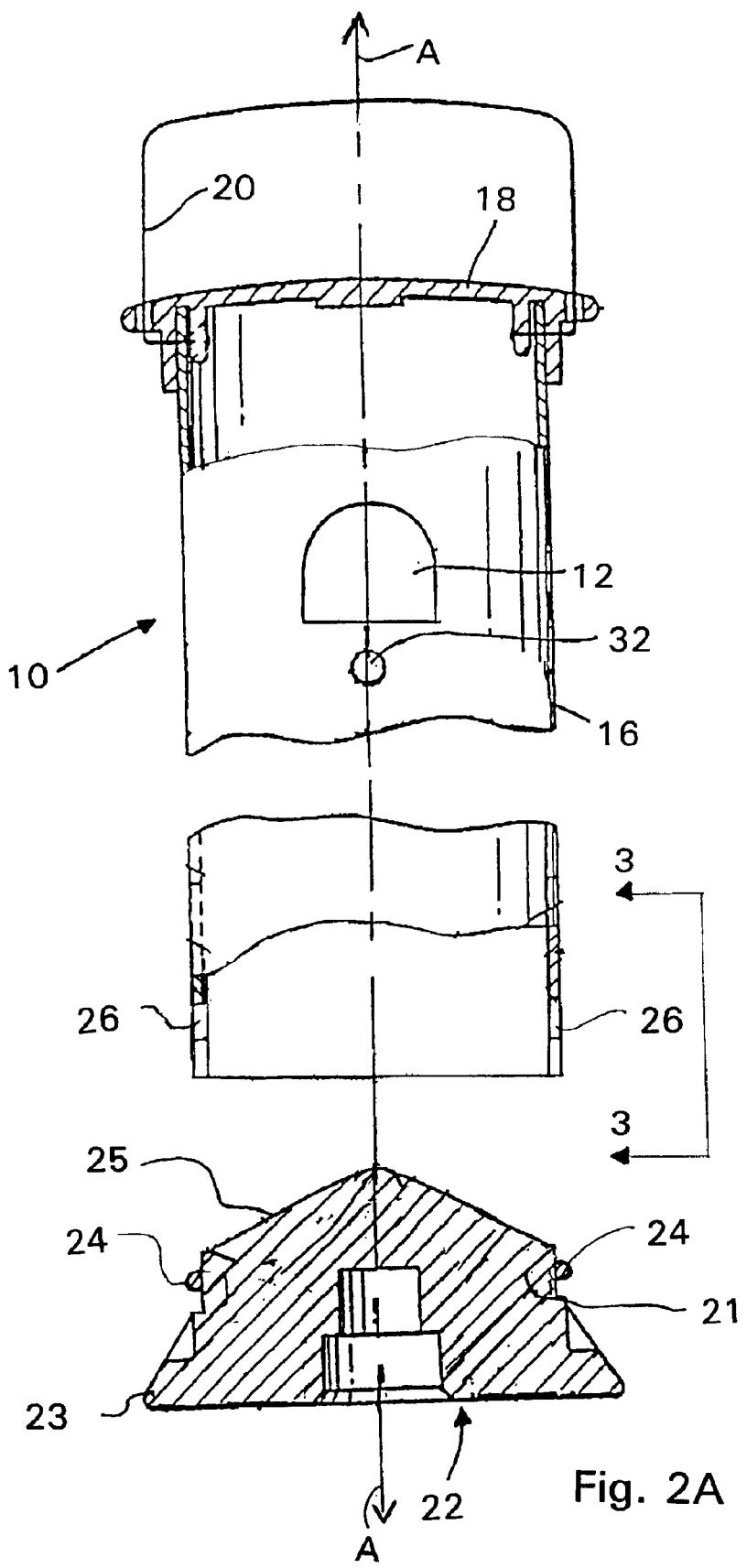
FIG. 2A is a diagrammatic front elevational view, similar to FIG. 2 and shown partly in cross section, showing the base removed from the bird feeder.
Figure 3:
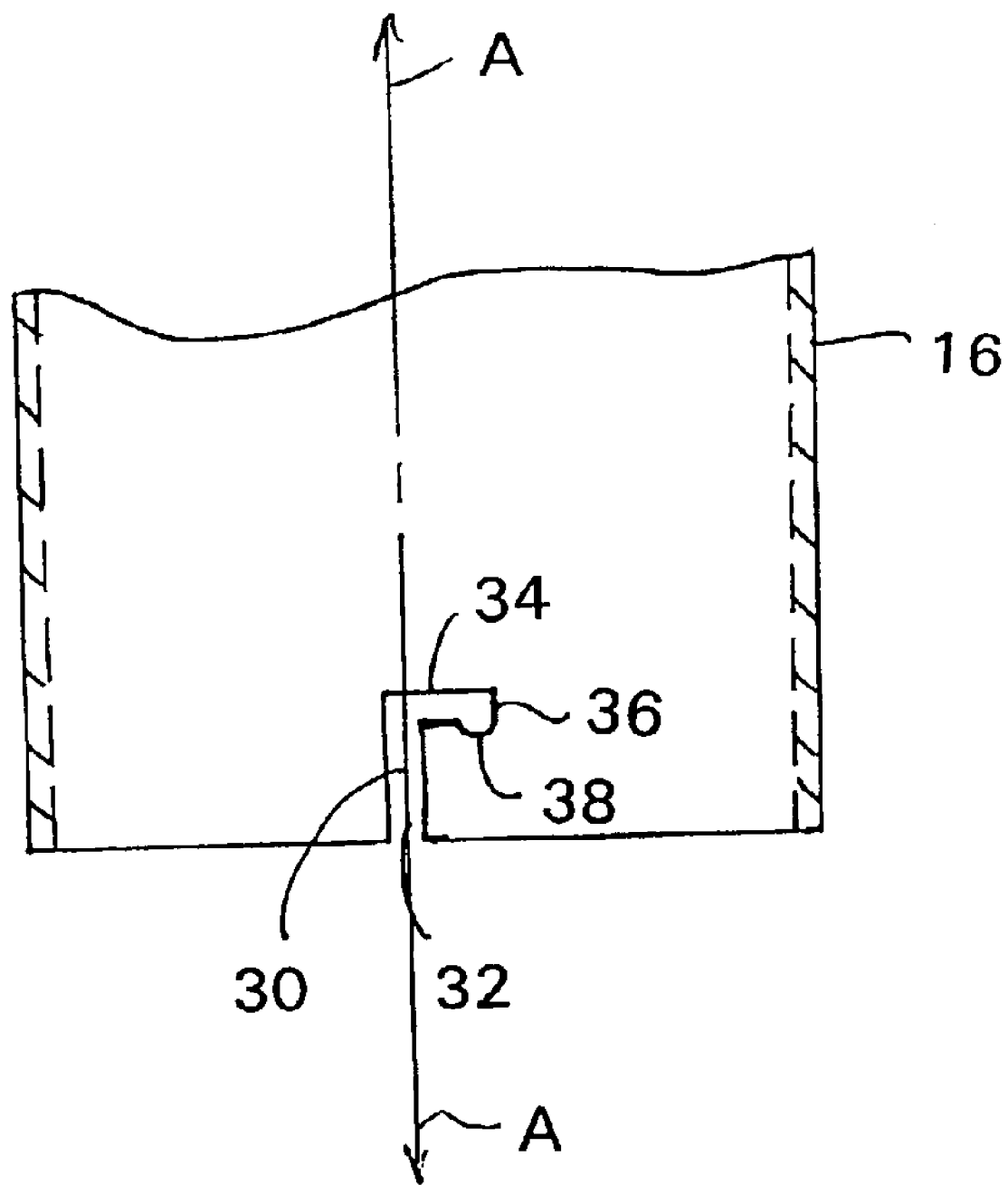
FIG. 3 is a diagrammatic partially view of the bottom end of the bird feed container, along line 3—3 of FIG. 2A and shown partly in cross section, showing the L-shaped slot.

According to a first embodiment of the present invention shown in FIG. 2A, the smaller dimensioned cylindrical portion 21 of the base 22 is provided with at least pair of diametrically opposed projections 24, or possibly three or more equally spaced projections, and these diametrically opposed projections 24 are located and shaped to engage with a complimentary pair of diametrically opposed L-shaped slots, as shown in FIG. 3, or possibly three or more equally spaced L-shaped slots, formed adjacent the bottom end of the bird feed container 10, to facilitate releasable attachment of the base 22 thereto. That is, in order to engage with the lower portion of the bird feed container 10, a user aligns the projections 24 with an entryway 32 of the L-shaped slots 26 provided in the bottom end of the sidewall 16 of the bird feed container 10. The base 22 is then moved longitudinally along the longitudinal axis A of the bird feed container 10, i.e., toward the top end of the bird feed container 10, and such longitudinal motion causes the projections 24 enter into and be received by the entryway of the L-shaped slots 26. When the projections 24 abut against a top walls 34 of the L-shaped slots 26, further longitudinal movement of the base 22, along the longitudinal axis A of the bird feed container 10, is prevented. Thereafter, the base 22 is then rotated relative to the bird feed container 10, e.g., in either a clockwise or counter clockwise direction depending upon the orientation of the L-shaped slots 26, until the projections 24 abut against end walls 36 of the L-shaped slots. Finally, the base 22 is released by the user and gravity generally causes the base 22 to move slightly in an opposite longitudinally direction, i.e., along the longitudinal axis A of the bird feed container 10 away from the top end, and such longitudinal motion causes the projections 24 to seat and be captively received by respective notch areas 38 of the L-shaped slots 26. Thereafter, the weight of the base 22 will generally maintain the base 22 in secured engagement with the bird feed container 10. The respective notch area 38 captively retains each projection so as to prevent inadvertent rotation of the base 22 member, relative to the bird feed container 10, and thereby minimizing the likelihood that the base 22 will become inadvertently removed or separated from the bird feed container 10. This also facilitates alignment of the feed divert surfaces of the base 22 to direct the bird feed toward the lower most feeder ports 14.

If desired, the perimeter bottom end of the bird feed container 10 or a mating perimeter surface of the base 22, i.e., the interface between the smaller dimensioned cylindrical portion 21 and the larger head portion 23 of the base 22, can be provided with a rubber gasket, or some other seal member (not shown), to provide a water tight seal between the bottom end of the bird feed container 10 and the base 22. Such a seal member will also limit the amount of "play" between the bird feed container 10 and the base 22 and thereby provide a snug seal between those two components.

Figure 2E:
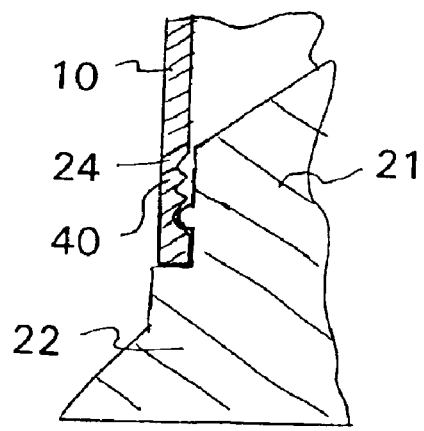
FIG. 2E is a partial diagrammatic cross sectional view showing a third variation of the first embodiment of the base and the bird feed container of FIG. 2.
Figure 2B:
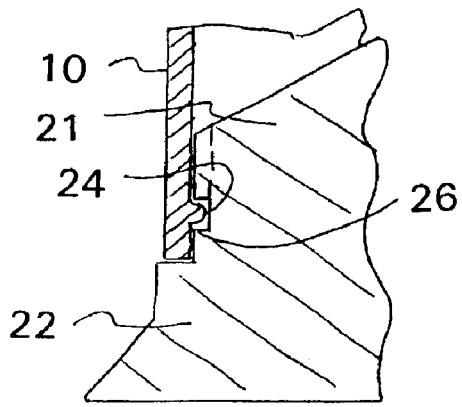
FIG. 2B is a partial diagrammatic cross sectional view showing a first variation of the first embodiment of the base and the bird feed container of FIG. 2.
Figure 2E:
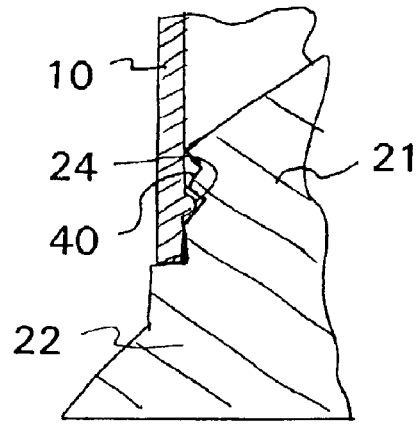

It is to be appreciated that the arrangement of the diametrically opposed projections 24 and the diametrically opposed L-shaped slots 26 can be reversed without departing from the spirit and scope of the invention, as can be seen in FIG. 2B. That is, the pair of diametrically opposed projections 24 may be supported by an inwardly facing surface of the bird feed container 10 and directed inwardly while the pair of diametrically opposed L-shaped slots 26 are formed in an outwardly facing surface of the smaller dimensioned cylindrical portion 21 of the base 22. As this modification functions similar to the first embodiment, a further detail discussion concerning the same is not provided.

Figure 2C:
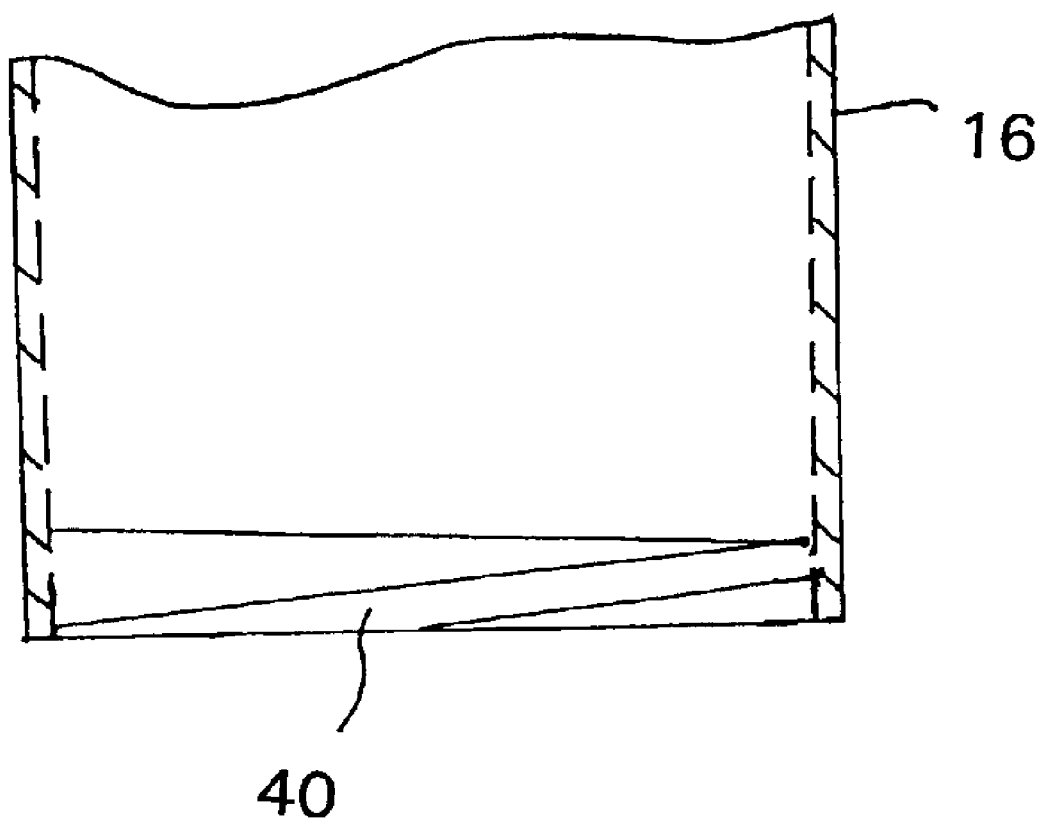
FIG. 2C is a partial diagrammatic cross sectional view showing a female thread on the bottom end of the bird feed container.

A third variation of the first embodiment is shown in FIGS. 2C and 2D. The major difference of this variation is that exterior surface of the smaller dimensioned cylindrical portion 21 of the base 22 is provided with either a protrusion 24 or a male thread and an interior surface of the bottom end of the bird feed container 10 is provided with a mating female thread 40 (see FIG. 2C). Due to this arrangement, when the end user desires to remove the base 22 from engagement with the bottom end of the bird feed container 10, the end user will rotate the base 22, relative to the lower portion of the bird feed container 10, to unscrew the base 22 and remove the same from the bird feed container 10. Thereafter, the base 22 can be adequately cleaned and then re-engaged with the bottom end of the bird feed container 10 by inserting the smaller dimensioned cylindrical portion 21 of the base 22 into the bottom end and again rotating the base 22, relative to the lower portion of the bird feed container 10, to reattach the base 22 to the bird feed container 10.

It is to be appreciated that the arrangement of the protrusion 24 or male thread and the female thread 40 can be reversed, without departing from the spirit and scope of the invention, as shown in FIG. 2E. That is, the protrusion 24 or male thread may be provided by an inwardly facing surface of the bird feed container 10 while the female thread 40 is formed on the protruding, smaller dimensioned cylindrical portion 21 of the base 22. As this modification functions similar to the above discussed embodiments, a further detail discussion concerning the same is not provided.

Figure 4B:
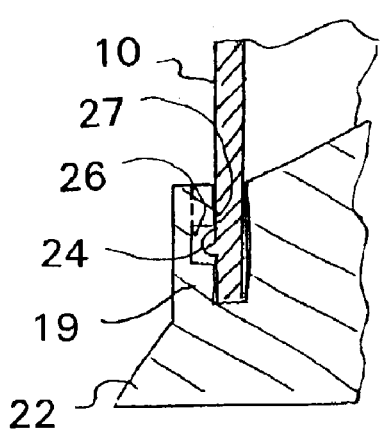
FIG. 4B is a partial diagrammatic cross sectional view showing a first variation of the second embodiment of the base and the bird feed container of FIG. 4.
Figure 4D:
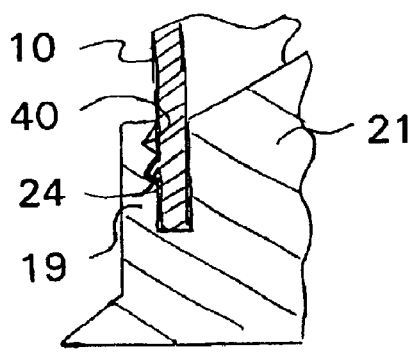
FIG. 4D is a partial diagrammatic cross sectional view showing a third variation of the second embodiment of the base and the bird feed container of FIG. 4.
Figure 4C:
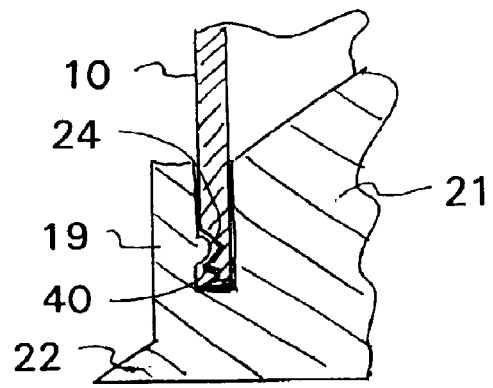
FIG. 4C is a partial diagrammatic cross sectional view showing a second variation of the second embodiment of the base and the bird feed container of FIG. 4.
Figure 4A:
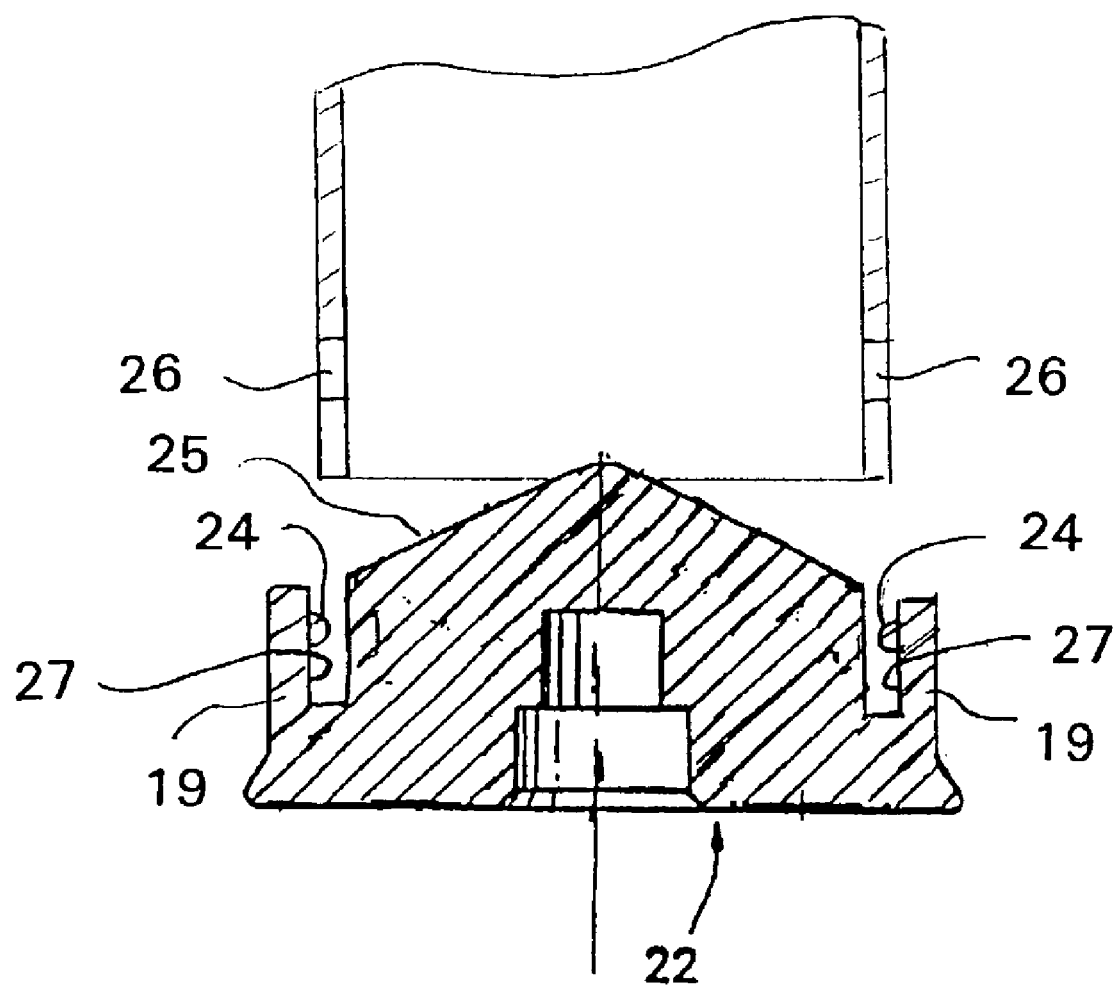
FIG. 4A is a partial diagrammatic cross sectional view showing a second embodiment for releasing the base from the bird feed container of FIG. 4.

The shape of the base member can be modified such that the base is provided with a shroud portion 19, as well as the smaller dimensioned cylindrical portion 21, that is sized to receive the bottom end of the bird feed container 10, as can be seen in FIG. 4A. According to this embodiment, an inwardly facing surface 27 of the shroud portion 19 of the base 22 is provided with at least pair of diametrically opposed projections 24, or possibly three or more equally spaced projections, and these diametrically opposed projections 24 are located and shaped to engage with a complimentary pair of diametrically opposed L-shaped slots (see FIG. 3) or possibly three or more equally spaced L-shaped slots, formed adjacent the bottom end of the bird feed container 10, to facilitate releasable attachment of the base 22 thereto. That is, in order to engage with the lower portion of the bird feed container 10, a user aligns the projections 24 with an entryway 32 of the L-shaped slots 26 provided in the bottom end of the sidewall 16 of the bird feed container 10. The base 22 is then moved longitudinally along the longitudinal axis A of the bird feed container 10, i.e., toward the top end of the bird feed container 10, and such longitudinal motion causes the projections 24 enter into and be received by the entryway of the L-shaped slots 26. When the projections 24 abut against a top walls 34 of the L-shaped slots 26, further longitudinal movement of the base 22, along the longitudinal axis A of the bird feed container 10, is prevented. Thereafter, the base 22 is then rotated relative to the bird feed container 10, e.g., in either a clockwise or counter clockwise direction depending upon the orientation of the L-shaped slots 26, until the projections 24 abut against end walls 36 of the L-shaped slots. Finally, the base 22 is released by the user and gravity generally causes the base 22 to move slightly in an opposite longitudinally direction, i.e., along the longitudinal axis A of the bird feed container 10 away from the top end, and such longitudinal motion causes the projections 24 to seat and be captively received by respective notch areas 38 of the L-shaped slots 26. Thereafter, the weight of the base 22 will generally maintain the base 22 in secured engagement with the bird feed container 10. The respective notch area 38 captively retains each projection so as to prevent inadvertent rotation of the base 22 member, relative to the bird feed container 10, and thereby minimizing the likelihood that the base 22 will become inadvertently removed or separated from the bird feed container 10.

It is to be appreciated that the arrangement of the diametrically opposed projections 24 and the diametrically opposed L-shaped slots 26 can be reversed without departing from the spirit and scope of the invention, as can be seen in FIG. 4B. That is, the pair of diametrically opposed projections 24 may be supported by an outwardly facing surface of the bird feed container 10 and directed outwardly while the pair of diametrically opposed L-shaped slots 26 are formed in the inwardly facing surface 27 of the shroud portion 19 of the base 22. As this modification functions similar to the above discussed embodiment, a further detail discussion concerning the same is not provided.

A third variation of the second embodiment is shown in FIG. 4C. According to this embodiment, the shroud portion 19 of the base 22 is provided with either a protrusion 24 or a male thread and an exterior surface of the bottom end of the bird feed container 10 is provided with a mating female thread 40. Due to this arrangement, when the end user desires to remove the base 22 from engagement with the bottom end of the bird feed container 10, the end user will rotate the base 22, relative to the lower portion of the bird feed container 10, to unscrew the base 22 and remove the same from the bird feed container 10. Thereafter, the base 22 can be adequately cleaned and then re-engaged with the bottom end of the bird feed container 10 by inserting the shroud portion 19 of the base 22 about the bottom end and again rotating the base 22, relative to the lower portion of the bird feed container 10, to reattach the base 22 to the bird feed container 10.

It is to be appreciated that the arrangement of the protrusion 24 or a male thread and the mating female thread can be reversed without departing from the spirit and scope of the invention, as shown in FIG. 4D. That is, the protrusion 24 or a male thread can be supported by an outwardly facing surface of the bird feed container 10 and directed outwardly while the mating female thread 40 is formed in an inwardly facing surface of the shroud portion 19 of the base 22. As this modification functions similar to the above discussed embodiment, a further detail discussion concerning the same is not provided.

Figure 5:
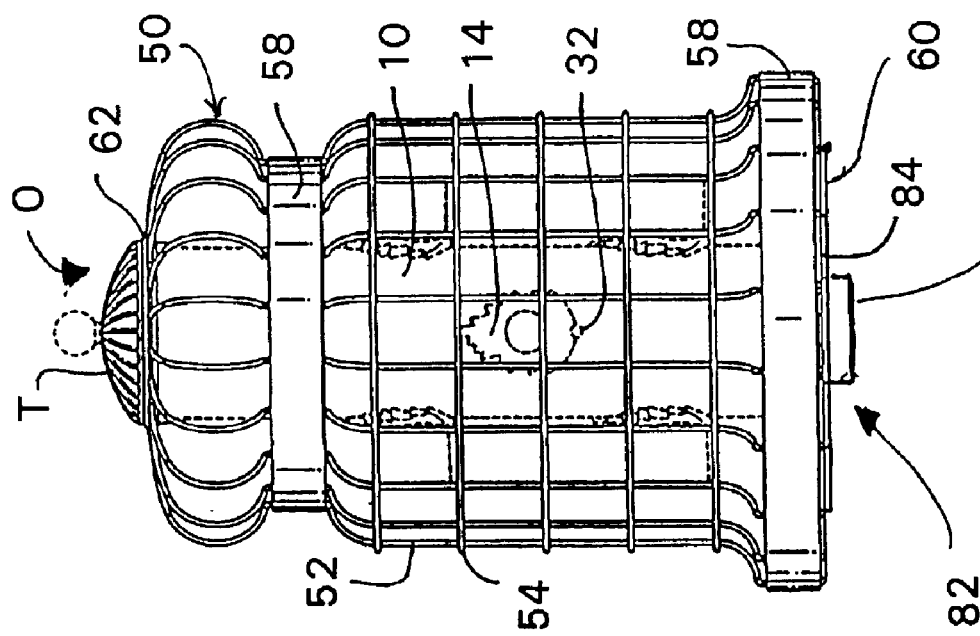
FIG. 5 is a diagrammatic front elevational view of the improved bird feeder, according to the present invention, in combination with a cage.

As shown in FIG. 5 the bird feeder 8 according to the present invention may be used in combination with an outer cage or openwork 50. The cage 50 is defined by a plurality of longitudinal members 52 extending between an upper collar 62, defining a top opening O, and a base collar 60. The longitudinal members 52 are arranged radially about the longitudinal axis A extending through a center of bird feed container 10. Each one of the longitudinal members 52 is sufficiently circumferentially spaced apart from one another such that smaller birds can enter the cage 50, between the adjacent longitudinal members 52, and access the bird feed contained within the bird feed container 10 while larger sized birds or animals are unable to pass through the cage 50 to access the bird feed. A preferred spacing of the adjacent longitudinal members 52 from one another is about 1½ inches or so, although other spacings are possible.

A plurality of spaced apart horizontal members 54 are attached to the longitudinal members 52 and the horizontal members 54 extend substantially perpendicular to the longitudinal members 52. In a preferred embodiment, the cage 50 also includes a pair of horizontal bands 58 for added structural integrity as well as for decorative purposes, i.e., the horizontal bands 58 can provide the bird feeder with a decorative flare as well as form a functional part of the cage 50. The adjacent horizontal members 54 are sufficiently spaced apart from one another such that smaller birds can enter the cage 50 and access bird feed container 10 while larger sized birds or animals are unable to pass through the cage 50 to access the bird feed. The bands 58 are also sufficiently spaced apart from adjacent horizontal member (s) 54 such that smaller birds can enter the cage 50 and access bird feed container 10 while certain larger birds or animals are unable to pass through the cage 50 to access the bird feed. A preferred spacing of the adjacent horizontal members 54 and the bands 58 from one another is about 1½ inch or so, although other spacings are possible.

The longitudinal members 52 may have any desired shape or curvature and may include a plurality of bends or contours along the length thereof. An upper ends of each of the longitudinal members are securely attached to the upper collar 62 while the lower ends of the longitudinal members 52 are each securely attached to the base collar 60. The cage 50 has a removable cover T adapted to cover the opening O provided in the top of the cage 50 and engage with and/or cover the top end of the bird feed container 10. The opening O provides access to the interior space of the bird feed container 10 to facilitate pouring, filling and/or supplying bird feed to the bird feed container 10 and/or routine cleaning or maintenance of the bird feeder 8.

Figure 6:
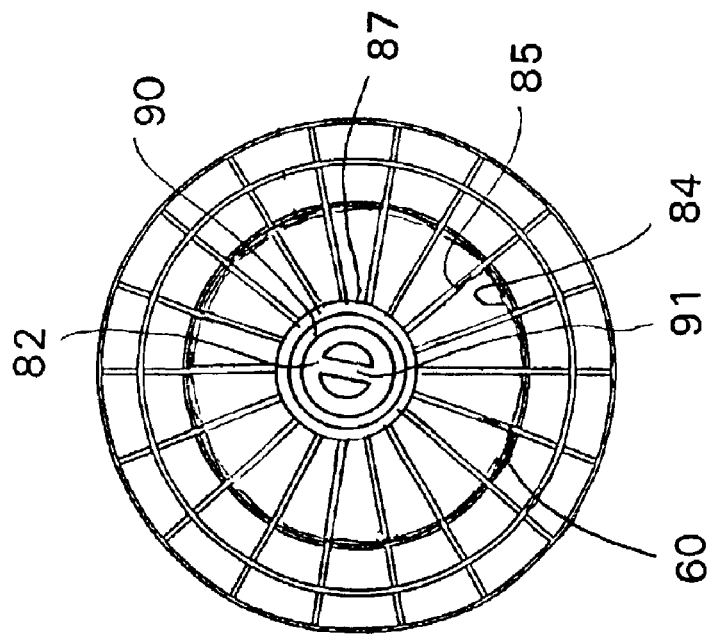
FIG. 6 is a diagrammatic bottom plan view of the improved bird feeder of FIG. 5.

Referring now to FIG. 6, a flange 84 extends radially inward from the base collar 60 and a radially inner most surface of the flange 84 is connected to a container collar 87 which fixedly supports the bird feed container 10, e.g., the container collar 87 is fixedly connected to the bottom end of the bird feed container 10 by conventional fasteners or some other known fastening technique. The flange 84 generally comprises a plurality of radially extending spaced apart arms or members 85 to allow moisture and/or any unconsumed bird feed or debris to fall through the bottom of the bird feeder 8 to the ground. The outer circumferential edge of the flange 84, e.g., the radially outer most portion of each spaced apart arm or member 85, is fixedly secured, by welding or some other conventional fastener technique or the like, to the base collar 60 of the cage 50 while the radially inner most portion of each spaced apart arm or member 85, is fixedly secured, by welding or some other conventional fastener technique or the like, to the container collar 87.

A base 82, similar to the above described base 22, is utilized in combination with the cage 50 described above. The removable base 82 has both an open position in which the base 82 is removed and spaced from the bottom end of the bird feed container 10, and a closed position, in which the base 82 is snugly received by the bottom end of the bird feed container 10. When the base 82 is removed from the bottom end of the bird feeder, as described below in further detail, this provides access to both the base 82 as well as the bottom end of the bird feed container 10 to facilitate cleaning thereof, e.g., with a brush or some other tool. Once both the base 82 and the bird feed container 10, including the bottom end thereof, are adequately cleaned, the base 82 is then reattached to or reengaged with the bottom end of the bird feed container 10 so that the base 82 will again be positioned to support bird feed once additional bird feed is loaded into the bird feed container 10 following cleaning.

Figure 7A:
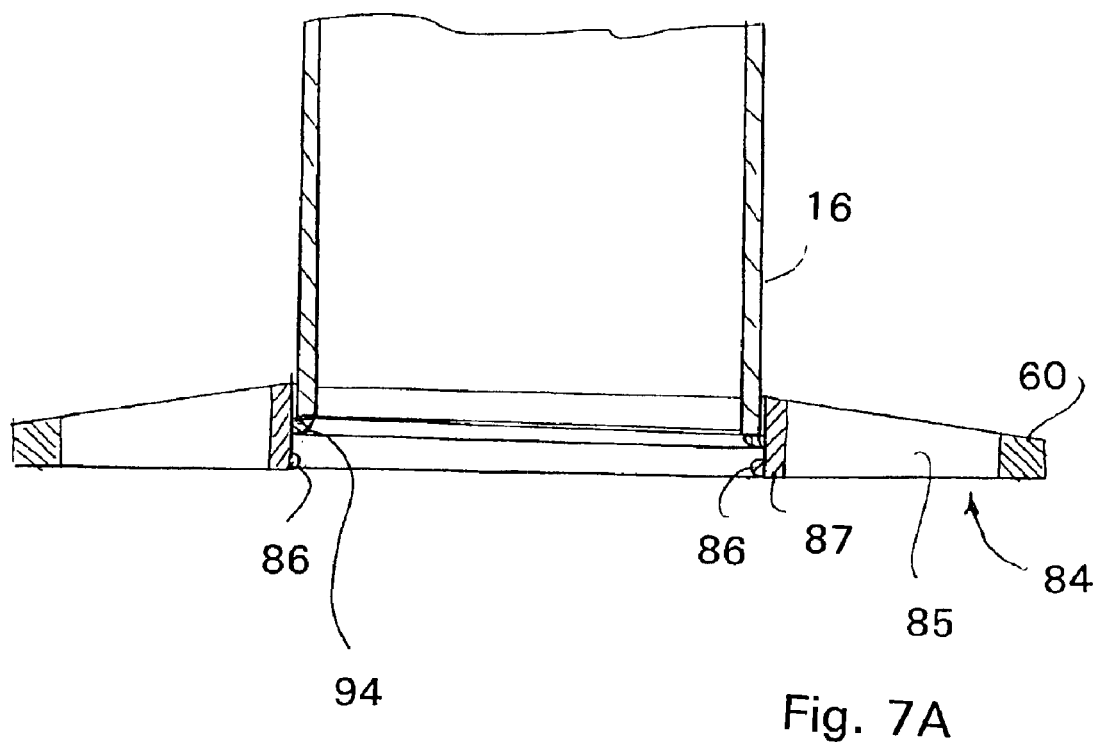
FIG. 7A is a diagrammatic cross sectional view of a feeder container flange and base combination for use with the bird feeder of FIG. 5.
Figure 7B:
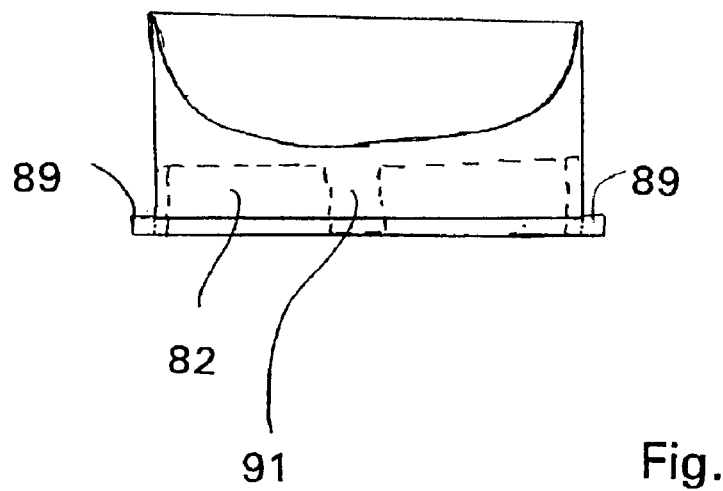
FIG. 7B is a side elevational view of base of FIG. 5.
Figure 7C:
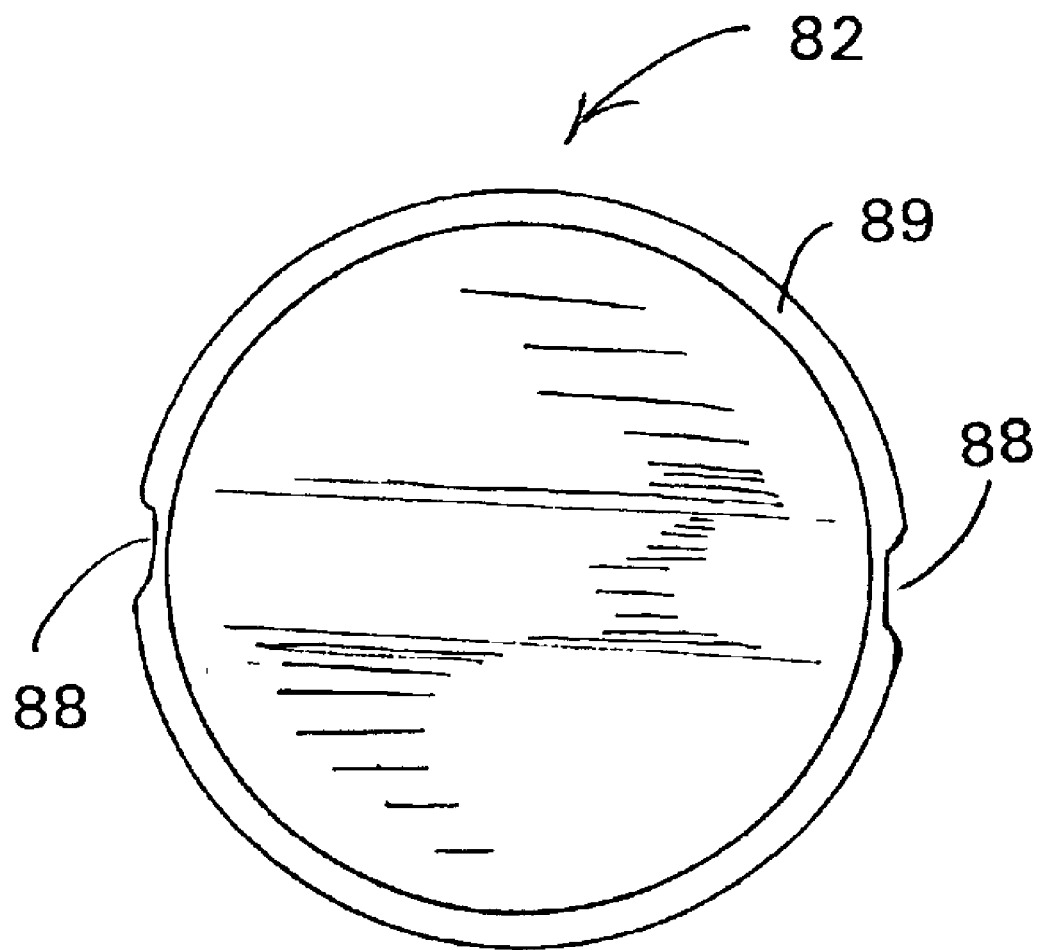
FIG. 7C is a top plane view of base of FIG. 5.

As shown in FIGS. 7A, 7B and 7C, the base 82 is releasably attached to the container collar 87 by a pair of radially extending diametrically opposed tabs 86 supported by the container collar 87 engaging with an annular shoulder 89 of the base 82 that has a pair of diametrically opposed slots 88 formed therein to allow passage of the diametrically opposed tabs 86 therethrough. The diametrically opposed tabs 86 are sized to pass freely through one of the diametrically opposed slots 88 while the diametrically opposed tabs 86 have an interference fit with the annular shoulder 89 to retain the base 82 engaged with the bottom end of the bird feed container 10. If desired, the annular shoulder 89 can be slightly or very gradually inclined, e.g., like a very gradual pitch screw thread, so that as the tabs 86 slides along a downwardly facing surface of the annular shoulder 89, the base 82 is gradually moved longitudinally along the longitudinal axis A of the bird feed container 10 toward the top end of the bird feed container 10. This causes an annular ledge 94, supported by the container collar 87 adjacent the diametrically opposed tabs 86, to engage with an upwardly facing surface of the annular shoulder 89 and form a stop to bock the base 82 and prevent further longitudinal movement of the base 82 along the longitudinal axis A of the bird feed container 10 toward the top end of the bird feed container 10.

In order to disengage the base 82 from the bottom end of the bird feed container 10, the base 82 is rotated relative to the remainder of the bird feeder 8 so that the diametrically opposed tab 86 are aligned with the diametrically opposed slots 88. Once this occurs, the diametrically opposed tabs 86 pass freely through the respective diametrically opposed slots 88 and the base 82 is then moved longitudinally along the longitudinal axis A of the bird feed container 10, i.e., away from the top end of the bird feed container 10, and such longitudinal motion causes the base 82 to be removed from the bird feeder 8. Thereafter, both the base 82 and the bird feed container 10, including the bottom end thereof, can be adequately cleaned. Finally, the base 82 is then reattached to or reengaged with the bottom end of the container collar 87 so that the base 82 will be again located to support additional bird feed once loaded into the bird feed container 10.

It is to be appreciated that the arrangement of the slots 88 and annular shoulder 89 and the mating tabs 86 and annular ledge 94 can be reversed without departing from the spirit and scope of the invention. That is, the slots 88 and annular shoulder 89 can be supported by the container collar 87 and directed radially inwardly while the mating tabs 86 and annular ledge 94 is formed on an outwardly facing surface of the base 82. As this modification functions similar to the above discussed embodiment, a further detail discussion concerning the same is not provided.

The base 82 may be provided with a manual release handle or hand grip 91 which facilitates rotational and longitudinal movement of the base 82 relative to a remainder of the bird feeder 8. The base 82 may also be provided with drainage holes (not shown) which extend through the bottom surface of the base 82 to facilitate drainage of any moisture which is located within the bird feeder. As is readily apparent to one of skill in the art, by twisting or rotating the base 82 relative to a remainder of the bird feeder 8, via the handle or grip 90, this facilitates disengagement of the base 82 from the remainder of the bird feeder 8 to enable the user to remove the base 82 therefrom. Thereafter, the base 82 can then be separated from the bird feed container 10 in order to more easily and throughly clean the bird feeder tube 10.

Figure 8:
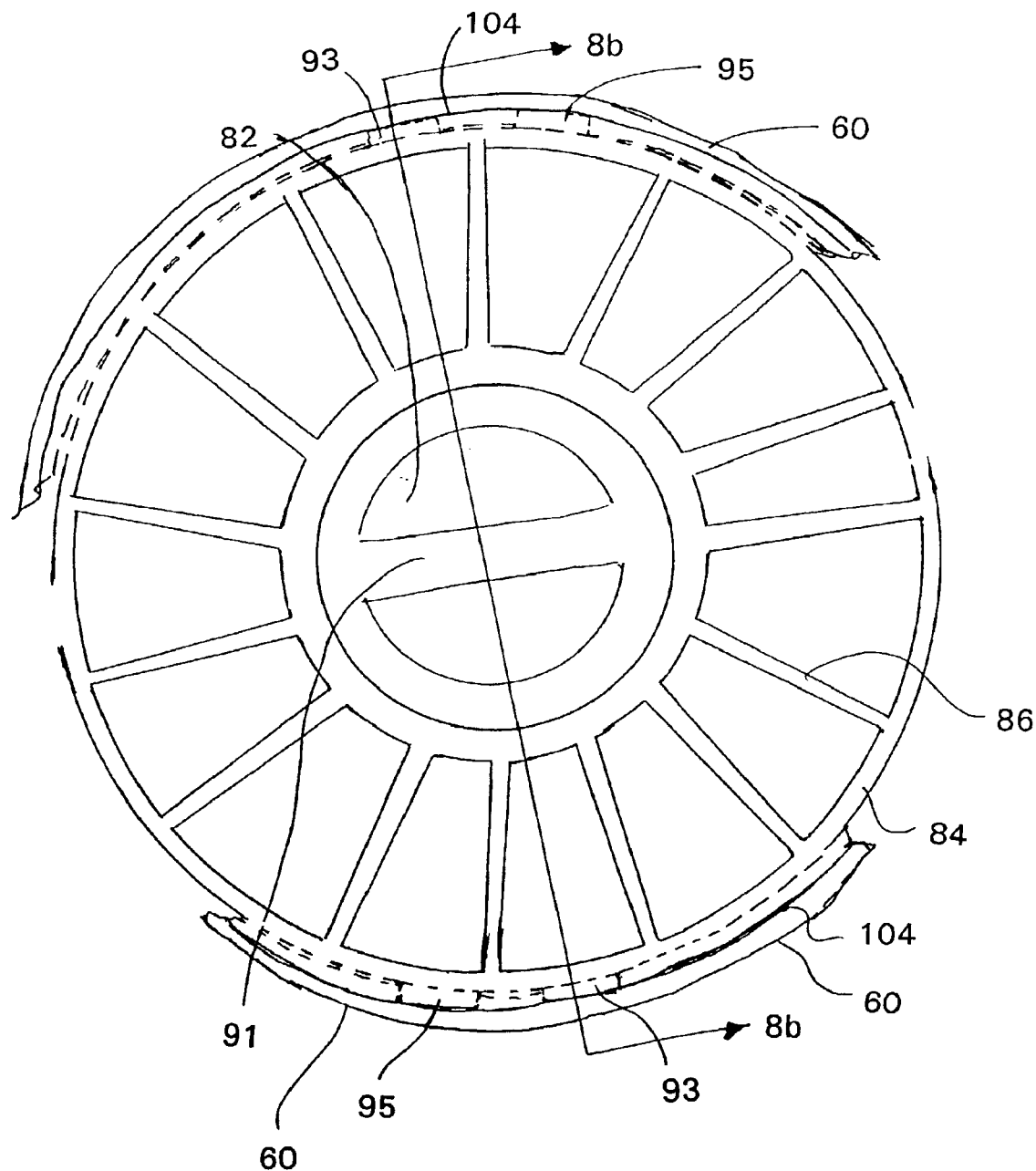
FIG. 8 is a diagrammatic bottom plan view of the flange and base combination affixed as an integral unit and separable from the cage collar and the feed container.
Figure 8A:
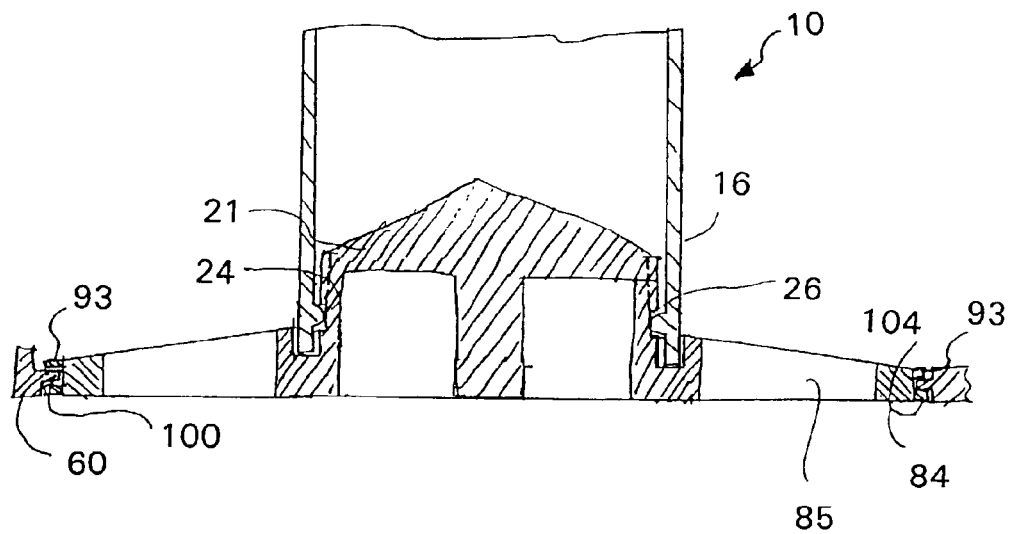
FIG. 8A is a partial diagrammatic cross sectional view of the base lower portion of the cage of FIG. 8.

Referring now to FIGS. 8 and 8A, a further embodiment in which the flange 84 is integrally connected to the base 82, e.g., is formed integral therewith or connected thereto via conventional fasteners (not shown), is shown. It is to be appreciated that the container collar is not necessary in this embodiment and is eliminated. According to this embodiment, a portion of the base 82, e.g., the smaller dimensioned cylindrical portion 21, is releasably engaged with the bottom end of the bird feed container 10 via one of the releasably fastening arrangements discussed above, e.g., a projection and mating L-shaped slot (see FIG. 8A). The outer circumferential edge of the flange 84 supports a first releasable coupling member, e.g., a key, a first thread, a plurality of tabs or some other releasable coupling member discussed above, such as a pair of flange tabs 93 for engagement with a complimentary second releasable coupling member, e.g., a mating key, a mating second thread, a mating plurality of slots or some other releasable coupling member discussed above, such as an annular shoulder 100 and slot 95 arrangement supported by the base collar 60. The second releasable coupling member 98 is sized to receive and engage with the first releasable coupling member 96 to facilitate releaseable attachment of the base 84 to the base collar 60. For example, as shown in FIGS. 8 and 8A, the first releasable coupling member 96 may be diametrically opposed flange tabs 93 and the second releasable coupling member 98 may be an annular collar shoulder 100 having collar slots 95 formed therein which allow the diametrically opposed flange tabs 93 to pass freely therethrough. The diametrically opposed flange tabs 93 have an interference fit with the annular collar shoulder 100 to retain the base 82 engaged with the base collar 60. If desired, the annular collar shoulder 100 can be slightly or very gradually inclined, e.g., like a screw thread with a very gradual pitch, so that as the diametrically opposed flange tabs 93 slide along the annular collar shoulder 100, the base 82 is gradually moved longitudinally along the longitudinal axis A of the bird feed container 10 toward the top end of the bird feeder 8. This causes an annular flange ledge 104, supported by the flange of the base 82, to engage with a downwardly facing surface of the annular collar shoulder 100 of the base collar 60 and form a stop to prevent further longitudinal movement of the base 82 along the longitudinal axis A toward the top end of the bird feeder 8.

In order to disengage the base 82 from the base collar 60, the base 82 is rotated relative to the base collar 60 so that the diametrically opposed flange tabs 93 slide along an upwardly facing surface of the annular collar shoulder 100 until the diametrically opposed flange tabs 93 are aligned with the diametrically opposed collar slots 95. Once this occurs, the diametrically opposed flange tabs 93 pass freely through the diametrically opposed collar slots 95 and the base 82 is then moved longitudinally along the longitudinal axis A of the bird feed container 10, i.e., away from the top end of the bird feeder 8, and such longitudinal motion causes the base 82 along with the supported bird feed container 10 to be removed from the bird feeder 8. Thereafter, the supported bird feed container 10 can be removed from the base 82, in the previously discussed manner, by releasably disengaging the supported bird feed container 10 from the base 82. Both the base 82 and the bird feed container 10, including the bottom end thereof, can be then be adequately cleaned. Finally, the base 82 is then reattached to the bird feed container 10 and then the base/flange/bird feed container combination is reengaged with the base collar 60 so that the top end of the bird feed container 10 is engaged with the cover and the base 82 and the bird feed container 10 are again located to received and dispense additional bird feed.

Figure 9A:
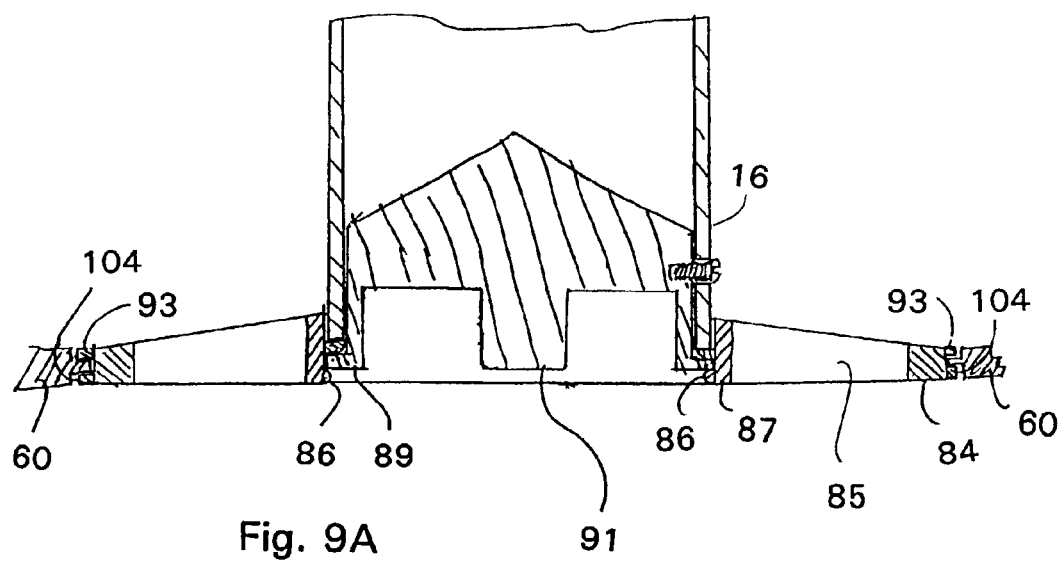
FIG. 9A is a partial diagrammatic cross sectional view of the base lower portion of the cage and the bird feed container of FIG. 9.
Figure 9:
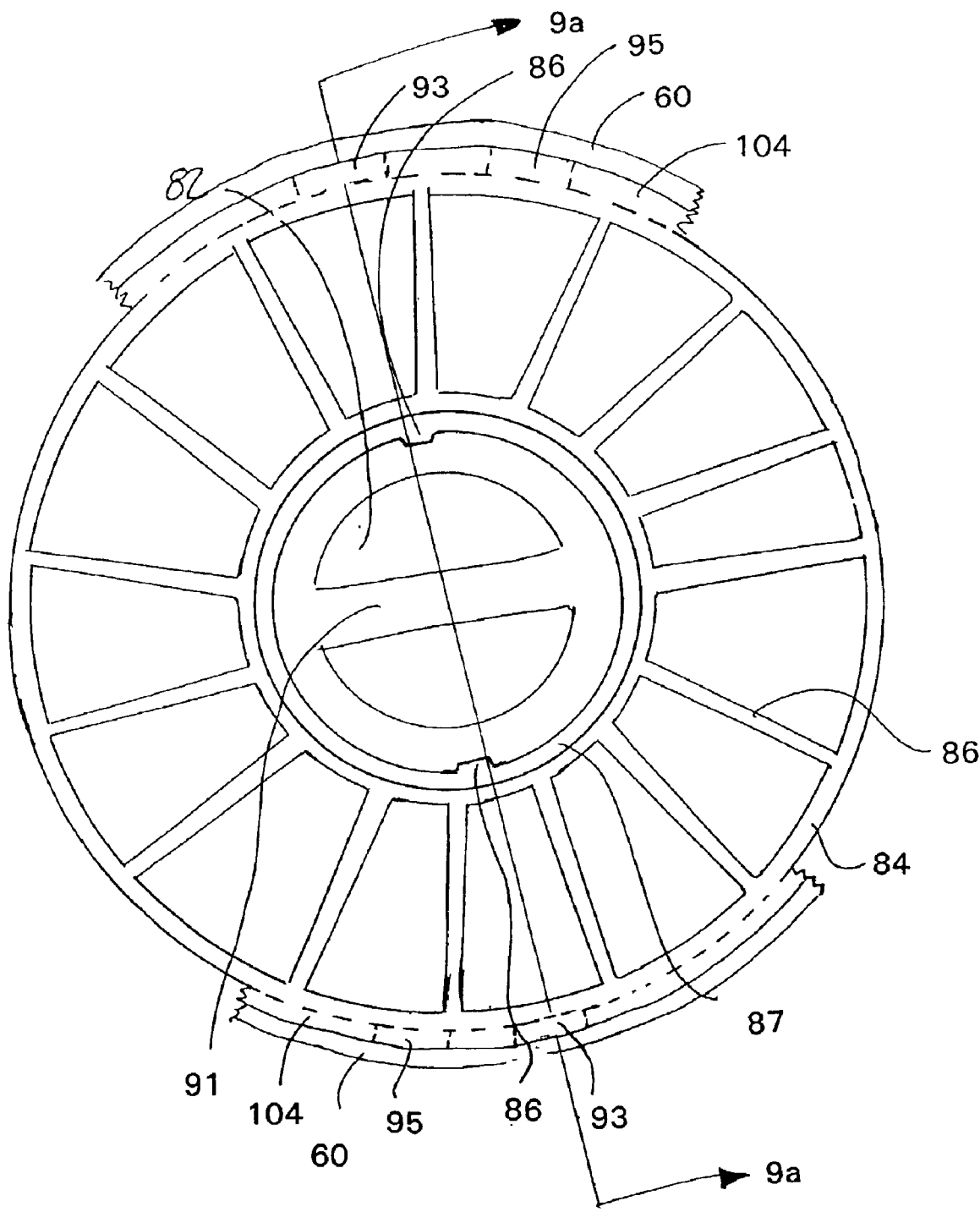
FIG. 9 is a diagrammatic bottom plan view of the flange and base combination separably affixed and as a separable unit with the cage collar and feed container.

A variation of the above discussed embodiment, shown in FIGS. 9 and 9A, has the base separate from the flange 84 and the flange 84 includes the container collar 87 which is connected to the inner perimeter of the flange 84. The container collar 87, in turn, is connected to the bottom end of the bird feed container 10 by conventional fasteners such as screws, for example. The smaller dimensioned cylindrical portion 21 of the base 82 is releasably engaged with the bottom end of the bird feed container 10 via one of the releasably fastening arrangements discussed above, e.g., diametrically opposed tabs 86 supported by the container collar 87 engaging with an annular shoulder 89 of the base 82 with a pair of diametrically opposed slots to allow passage of the diametrically opposed tabs 86 therethrough, for example. The outer circumferential edge of the flange 84 supports a first releasable coupling member 96, e.g., a key, a first thread, a plurality of tabs or some other releasable coupling member discussed above, for engagement with a complimentary second releasable coupling member 98, e.g., a mating key, a mating second thread, a mating plurality of slots or some other releasable coupling member discussed above, supported by the base collar 60. The second releasable coupling member 98 is sized to receive and engage with the first releasable coupling member to facilitate releaseable attachment of the base 84 to the base collar 60. For example, the first releasable coupling member 96 may be diametrically opposed flange tabs 93 and the second releasable coupling member 98 may be an annular collar shoulder 100 having collar slots 95 formed therein which allow the diametrically opposed flange tabs 93 to pass freely therethrough. The diametrically opposed flange tabs have an interference fit with the annular collar shoulder 100 to retain the base 82 engaged with the base collar 60. If desired, the annular collar shoulder can be slightly or very gradually inclined, e.g., like a screw thread with a very gradual pitch, so that as the diametrically opposed flange tabs 93 slide along the annular collar shoulder 100, the base 82 is gradually moved longitudinally along the longitudinal axis A of the bird feed container 10 toward the top end of the bird feeder 8. This causes an annular flange ledge 102, supported by the flange of the base 82, to engage with a downwardly facing surface of the annular collar shoulder of the base collar 60 and form a stop to prevent further longitudinal movement of the base 82 along the longitudinal axis A toward the top end of the bird feeder 8.

In order to disengage only the base 82 from the bottom end of the bird feed container 10, the base 82 is rotated and moved longitudinally along the longitudinal axis A, as discussed above, to separate solely the base 82 from a remainder of bird feeder 8 in the manner discussed above. Alternatively, the base 82, the flange 84 and the supported to the bottom end of the bird feed container 10 can be removed in combination with one another by both simultaneously rotating and moving those components longitudinally along the longitudinal axis A in unison with one another so that first releasable coupling member of the flange 84 is disengaged from the second releasable coupling member 98 of the base collar 60, in the manner discussed above. If desired, the base 82 may then be removed from its engagement with the bottom end of the bird feed container 10, in the manner discussed above, to facilitate adequate individual and separate cleaning of those components. Finally, all of the components may be reassembled by reversing the above discussed procedure.

If desired, the flange 84 may be a flat or planar piece of material instead of comprising a plurality of radially extending spaced apart arms or members 85. Preferably the base collar has a diameter which is large enough for the perches 32 to pass freely therethrough without abutting with the base collar 60.

It is to be appreciated that for all embodiments of the present invention, both longitudinal insertion and removal of the base 22 or 82, along the longitudinal axis A of the bird feeder 8, as well as rotational movement of the base 22, about the longitudinal axis A of the bird feeder, is required in order to either attach or remove the base 22 or 82 from the bird feed container 10, and such movement may be easily accomplished manually without the need for tools or any special device in order to simplify cleaning of the entire bird feeder.

In a further embodiment of the present invention, the base 82 and the flange 84 may be separate components which are separable from one another. The flange 84 may be affixed by screws or adhesive to the outer sidewall 16 of the bird feed container 10. The base 82 may be provided with protrusions or tabs to attach the base 82 with either the flange 84, the sidewall 16 of the feeder 10, or both components to provide greater strength and close the bottom end of the feed container 10. This entire unit, i.e., the feed container 10, the base 82 and the flange 84, may then be connected with the cage 50 as described above.

Since certain changes may be made in the above described releasably removable base for a bird feeder, without departing from the spirit and scope of the invention herein involved, it is intended that all of the subject matter of the above description or shown in the accompanying drawings shall be interpreted merely as examples illustrating the inventive concept herein and shall not be construed as limiting the invention.

We claim:

1. A bird feeder, for holding a quantity of bird feed, comprising:

an elongate bird feed container being open at opposed top and bottom ends thereof, and the bird feed container defining a longitudinal axis;

a plurality of feeding ports distributed vertically and circumferentially in a side wall of the bird feed container to facilitate eating of bird feed from the bird feed container by a bird;

wherein each feeding port has a perch which is located adjacent an inlet of the feeding port and extends normal to the longitudinal axis of the bird feeder, and each feeding port has a hood which prevents the bird feed from falling out through the inlet of the feeding port;

a removable cover for covering the open top end of the bird feed container; and a removable base having a smaller dimensioned portion being sized to be closely received completely within the bottom end of the bird feed container, the smaller dimensioned portion having a pair of diverter surfaces for diverting bird feed toward an adjacent feeding port, the removable base having a closed position, for sealing the open bottom end of the bird feed container and retaining bird feed within the bird feed container, and an open position in which the base is removed from the bird feed container to facilitate cleaning of the bird feed container and the base, and relative movement between the base and the bird feed container, both along the longitudinal axis of the bird feeder as well as rotation about the longitudinal axis, is required for removing the base from the bird feed container;

at least one pair of diametrically opposed projections are supported by one of the base and the bird feed container, and at least one complimentary pair of diametrically slots are formed on the other of the base and the bird feed container, and the at least one pair of diametrically opposed projections and the at least one complimentary pair of diametrically slots facilitate releasable engagement between the base and the bottom end of the bird feed container.

2. The bird feeder according to claim 1, wherein the cover is supported by the handle member and the cover slides along the handle member when moving to both the open position and the closed position.

3. The bird feeder according to claim 1, wherein the base has a head portion which has a larger dimension than the bottom end of the bird feed container.

4. The bird feeder according to claim 1, wherein the feeding ports are manufactured from one of steel, zinc, cast zinc, stainless steel, aluminum, and a plastic material and the is bird feed container is manufactured from one of cellulose acetate or polycarbonate.

5. The bird feeder according to claim 1, wherein the smaller dimensioned portion is cylindrical in shape and closely received completely within the bottom end of the bird feed container and an exterior surface of the smaller dimensioned cylindrical portion contacts the inner sidewall elongate bird feed container, and the base has at least one drainage hole in a bottom surface thereof to facilitate drainage of any moisture which is located within the bird feeder.

6. The bird feeder according to claim 1, wherein the inlet, the hood and the perch of the feeding port are all manufactured separately from one another.

7. A bird feeder, for holding a quantity of bird feed, comprising:
- an elongate bird feed container being open at opposed top and bottom ends thereof, and the bird feed container defining a longitudinal axis and having a constant diameter inner sidewall from the top end to the bottom end;
- a plurality of spaced apart horizontal members coupled to a plurality spaced part longitudinal members to form a cage with the plurality of spaced apart horizontal and longitudinal members being sufficiently spaced apart from one another such that desired birds can enter the cage while larger birds and animals are unable to pass through the cage;
- a handle member connected to the cage for hanging the bird feeder;
- a plurality of feeding ports distributed vertically and circumferentially in a sidewall of the bird feed container to facilitate eating of bird feed from the bird feed container by a bird;
  - wherein each feeding port has a perch which is located adjacent an inlet of the feeding port and extended normal to the longitudinal axis of the bird feeder, and each feeding port has a hood which prevents the bird feed from falling out through the inlet of the feeding port;
- a removable cover for covering the open top end of the bird feed container, the cover having both an open position, in which the cover is spaced from the top end to facilitate supplying bird feed into the bird feed container, and a closed position, in which the cover engages with and covers the top end of the bird feed container;
- a removable base having a smaller dimensioned cylindrical portion being sized to be closely received completely within the bottom end of the bird feed container and a larger head portion being sized larger than the bottom end of the bird feed container, the smaller dimensioned cylindrical pardon having a pair of diverter surfaces for diverting bird feed toward an adjacent feeding port, the removable base having a closed position, for sealing the open bottom end of the bird feed container and retaining bird feed within the bird feed container, and an open position in which the base is removed from the bird feed container to facilitate cleaning of the bird feed container and the base, and relative movement between the base and the bird feed container, both along the longitudinal axis of the bird feeder as well as rotation about the longitudinal axis, is required for removing the base from the bird feed container; and
- at least one pair of diametrically opposed projections are supported by one of the base and the bird feed container, and at least one complimentary pair of diametrically slots are formed on the other of the base and the bird feed container, and the at least one pair of diametrically opposed projections and the at least one complimentary pair of diametrically slots facilitate releasable engagement between the base and the bottom end of the bird feed container.

8. The bird feeder according to claim 7, wherein each feeding port has a perch which is located adjacent an inlet of the feeding port and extends normal to the longitudinal axis of the bird feeder, and each feeding port has a hood which prevents the bird feed from falling out through the inlet of the feeding port.

9. The bird feeder according to claim 7, wherein the inlet, the hood and the perch of the feeding port are all manufactured integrally with one another.

10. The bird feeder according to claim 9, wherein the base has a head portion which has a larger dimension than the bottom end of the bird feed container.

11. The bird feeder according to claim 9, wherein the inlet, the hood and the perch of the feeding port are all manufactured separately from one another.

12. The bird feeder according to claim 7, wherein the cover is supported by the handle member and the cover slides along the handle member when moving to both the open position and the closed position.

13. The bird feeder according to claim 7, wherein the feeding ports are manufactured from one of steel, zinc, cast zinc, stainless steel, aluminum, and a plastic material and the is bird feed container is manufactured from one of cellulose acetate or polycarbonate.

14. The bird feeder according to claim 7, wherein a bottom surface of the base has an aperture for receiving a member therein and facilitating support of the bird feeder.

15. A bird feeder, for holding a quantity of bird feed, comprising:
- an elongate bird feed container being open at opposed top and bottom ends thereof, and the bird feed container defining a longitudinal axis and having a constant diameter inner sidewall from the top end to the bottom end;
- a plurality of spaced apart horizontal members coupled to a plurality spaced part longitudinal members to form a cage, with the plurality of spaced apart horizontal and longitudinal members being sufficiently spaced apart from one another such that desired birds can enter the cage while larger birds and animals are unable to pass through the cage;
- a handle member connected to the cage for hanging the bird feeder;
- a plurality of feeding ports provided in a sidewall of the bird feed container to facilitate eating of bird feed from the bird feed container by a bird;
- a removable cover for covering the open top end of the bird feed container, the cover having both an open position, in which the cover is spaced from the top end to facilitate supplying bird feed into the bird feed container, and a closed position, in which the cover engages with and covers the top end of the bird feed container;

a removable base having a smaller dimensioned cylindrical portion being sized to be closely received completely within the bottom end of the bird feed container and a larger head portion being sized larger than the bottom end of the bird feed container, the smaller dimensioned cylindrical portion having a pair of diverter surfaces for diverting bird feed toward an adjacent feeding port, the removable base having a closed position, for sealing the open bottom end of the bird feed container and retaining bird feed within the bird feed container, and an open position in which the base is removed from the bird feed container to facilitate cleaning of the bird feed container and the base, and relative movement between the base and the bird feed container, both along the longitudinal axis of the bird feeder as well as rotation about the longitudinal axis, is required for removing the base from the bird feed container; and at least one pair of diametrically opposed projections are supported by one of the base and the bird feed container, and at least one complimentary pair of diametrically slots are formed on the other of the base and the bird feed container, and the at least one pair of diametrically opposed projections and the at least one complimentary pair of diametrically slots facilitate releasable engagement between the base and the bottom end of the bird feed container, wherein the cage includes a base collar and the base includes flange, and the outer periphery of the flange has a first releasable coupling member which is releasably engageable with a second releasable coupling member supported by the base collar to facilitate removal of both the base and the bird feed container from the cage.

16. A bird feeder, for holding a quantity of bird feed, comprising:

an elongate bird feed container being open at opposed top and bottom ends thereof, and the bird feed container defining a longitudinal axis and having a constant diameter inner sidewall from the top end to the bottom end;

a plurality of spaced apart horizontal members coupled to a plurality spaced part longitudinal members to form a cage, with the plurality of spaced apart horizontal and longitudinal members being sufficiently spaced apart from one another such that desired birds can enter the cage while larger birds and animals are unable to pass through the cage;

a handle member connected to the cage for hanging the bird feeder;

a plurality of feeding ports provided in sidewall of the bird feed container to facilitate eating of bird feed from the bird feed container by a bird;

a removable cover for covering the open top end of the bird feed container, the cover having both an open position, in which the cover is spaced from the top end to facilitate supplying bird feed into the bird feed container, and a closed position, in which the cover engages with and covers the top end of the bird feed container;

a removable base having a smaller dimensioned cylindrical portion being sized to be closely received completely within the bottom end of the bird feed container and a larger head portion being sized larger than the bottom end of the bird feed container, the smaller dimensioned cylindrical portion having a pair of diverter surfaces for diverting bird feed toward an adjacent feeding port, the removable base having a closed position, for sealing the open bottom end of the bird feed container and retaining bird feed within the bird feed container, and an open position in which the base is removed from the bird feed container to facilitate cleaning of the bird feed container and the base, and relative movement between the base and the bird feed container, both along the longitudinal axis of the bird feeder as will as rotation about the longitudinal axis, is required for removing the base from the bird feed container; and at least one pair of diametrically opposed projections are supported by one of the base and the bird feed container, and at least one complimentary pair of diametrically slots are formed on the other of the base and the bird feed container, and the at least one pair of diametrically opposed projections and the at least one complimentary pair of diametrically slots facilitate releasable engagement between the base and the bottom end of the bird feed container;

wherein the base collar has a fixedly connected flange and an inner periphery of the flange supports the bird feed container, and the inner periphery of the flange has a first releasable coupling member which is releasably engageable with a second releaseable coupling member carried by the base to facilitate removal of the base from the cage.

17. A bird feeder, for holding a quantity of bird feed, comprising:

an elongate bird feed container being open at opposed top and bottom ends thereof, and the bird feed container defining a longitudinal axis and having a constant diameter inner sidewall from the top end to the bottom end;

a plurality of spaced apart horizontal members coupled to a plurality spaced pert longitudinal members to form a cage with the plurality of spaced apart horizontal and longitudinal members being sufficiently spaced apart from one another such that desired birds can enter the cage while larger birds and animals are unable to pass through the cage;

a handle member connected to the cage for hanging the bird feeder;

a plurality of feeding ports provided in a sidewall of the bird feed container to facilitate eating of bird feed from the bird feed container by a bird;

a removable cover for covering the open top end of the bird feed container, the cover having both an open position, in which the cover is spaced from the top end to facilitate supplying bird feed into the bird feed container, and a closed position, in which the cover engages with and covers the top end of the bird feed container; and a removable base having a smaller dimensioned cylindrical portion being sized to be closely received completely within the bottom end of the bird feed container and a larger head portion being sized larger than the bottom end of the bird feed container, the smaller dimensioned cylindrical portion having a pair of diverter surfaces for diverting bird feed toward an adjacent feeding port, the removable base having a closed position, for sealing the open bottom end of the bird feed container and retaining bird feed within the bird feed container, and an open position in which the base is removed from the bird feed container to facilitate cleaning of the bird feed container and the base, and relative movement between the base and the bird feed container, both along the longitudinal axis of the bird feeder as well as rotation about the longitudinal axis, is required for removing the base from the bird feed container.

at least one pair of diametrically opposed projections are supported by one of the base and the bird feed container, and at least one complimentary pair of diametrically slots are formed on the other of the lease and the bird feed container, and the at least one pair of diametrically opposed projections and the at least one complimentary pair of diametrically slots facilitate releasable engagement between the base and the bottom end of the bird feed container wherein the cage includes a base collar and the base includes a fixedly connected flange, and the outer periphery of the flange has a first releasable coupling member which is releasably engageable with a second releasable coupling member supported by the base collar to facilitate removal of both the base and the bird feed container from the cage.

18. A bird feeder, for holding a quantity of bird feed, comprising:

an elongate bird feed container being at least open at a bottom end thereof, and the bird feed container defining a longitudinal axis;

a plurality of feeding ports distributed vertically and circumferentially in the bird feed container to facilitate a bird eating bird feed from the bird feed container;

wherein each feeding port has a perch which is located adjacent an inlet of the feeding port and extends normal to the longitudinal axis of the bird feeder, and each feeding port has a hood which prevents the bird feed from falling out through the inlet of the feeding port; and a removable base for engaging with the bottom end of the bird feed container, the removable base having a closed position, for sealing the open bottom end of the bird feed container and retaining bird feed within the bird feed container, and an open position in which the base is removed from the bird feed container to facilitate cleaning of the bird feed container and the base, and relative movement between the base and the bird feed container, both along the longitudinal axis of the bird feeder as well as rotation about the longitudinal axis for removing the base from the bird feed container;

at least one projection is supported by one of the base and the bird feed container, and at least one complimentary slot is formed on the other of the base and the bird feed container, and the at least one projection and the at least one complimentary slot facilitate releasable engagement between the base and the bottom end of the bird feed container.

* * * * *